(12) United States Patent
Gartner et al.

(10) Patent No.: US 10,476,554 B2
(45) Date of Patent: Nov. 12, 2019

(54) METHOD AND SYSTEM FOR PROXIMITY-BASED CONTENT SHARING

(75) Inventors: Jeff Gartner, Hopewell Junction, NY (US); Rabail Javed, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 853 days.

(21) Appl. No.: 13/159,189

(22) Filed: Jun. 13, 2011

(65) Prior Publication Data

US 2012/0315846 A1    Dec. 13, 2012

(51) Int. Cl.
*H04B 5/02* (2006.01)

(52) U.S. Cl.
CPC ..................... *H04B 5/02* (2013.01)

(58) Field of Classification Search
CPC ........ H04B 5/0031; H04B 5/02; H04W 4/008
USPC ................ 455/41.1, 41.2, 425, 411
See application file for complete search history.

(56) References Cited

U.S. PATENT DOCUMENTS

| | | | |
|---|---|---|---|
| 6,195,541 B1 | 2/2001 | Griffith | |
| 6,195,542 B1 | 2/2001 | Griffith | |
| 6,343,214 B1* | 1/2002 | Holmes | 455/411 |
| 6,356,752 B1 | 3/2002 | Griffith | |
| 7,873,996 B1* | 1/2011 | Emigh et al. | 726/22 |
| 8,244,917 B2* | 8/2012 | Takayama et al. | 710/1 |
| 2003/0005284 A1* | 1/2003 | Euchner | 713/152 |
| 2004/0097235 A1* | 5/2004 | Siegel | 455/445 |
| 2006/0148496 A1* | 7/2006 | Zhu | H04M 1/72552 455/466 |
| 2007/0101413 A1* | 5/2007 | Vishik et al. | 726/5 |
| 2007/0250212 A1* | 10/2007 | Halloran | A47L 5/30 700/245 |
| 2008/0081608 A1* | 4/2008 | Findikli et al. | 455/425 |
| 2008/0176516 A1* | 7/2008 | Kim | H04M 1/7253 455/41.2 |
| 2009/0111378 A1* | 4/2009 | Sheynman | H04W 8/005 455/41.1 |
| 2011/0209159 A1 | 8/2011 | Baratz et al. | |
| 2011/0319016 A1* | 12/2011 | Gormley et al. | 455/41.1 |
| 2012/0185291 A1* | 7/2012 | Ramaswamy | G06Q 10/1095 705/7.19 |

* cited by examiner

*Primary Examiner* — Yuwen Pan
*Assistant Examiner* — Fatuma G Sherif
(74) *Attorney, Agent, or Firm* — Sheridan Ross P.C.

(57) ABSTRACT

A system includes a combined NFC and Bluetooth interface that can interact with one or more other devices that also include the combined NFC and Bluetooth interface. A processor in the device executes an application that includes a thin client and a security wrapper. The thin client can package content in a packet with security settings and send the packet to the other device. Further, the thin client can accept packets from other devices. Based on one or more user settings and/or a level of trust between the devices, the thin client can determine if the packet should be accepted or rejected. If accepted, the thin client can store the content, located within the packet, for the user.

20 Claims, 9 Drawing Sheets

METHOD AND SYSTEM FOR PROXIMITY-BASED CONTENT SHARING

BACKGROUND

Today, people generally share the content of presentations, documents, agenda, electronic business cards and the like, during in-person meeting, via email or by an upload from a server or a link. When there is no network connection, sharing materials becomes even more difficult as people resort to providing a universal memory bus (USB) memory device or providing paper copies. With business cards, the information on the business card has to be manually entered or scanned into electronic contact lists. All of these efforts are time consuming and inefficient.

It may be possible to provide the materials through a connection to a corporate network or server. However, providing unfettered access to corporate networks to copy materials can cause significant security issues. It may be possible to use Infrared Data Association (IRDA) port synchronization, but IRDA is a one-to-one transfer and precludes broadcasting content to sever devices.

SUMMARY

It is with respect to the above issues and other problems that the embodiments presented herein were contemplated. The system includes a combined Near Field Communication (NFC) and Bluetooth interface that can interact with one or more other devices that also include the combined NFC and Bluetooth interface. In some embodiments, it may be possible to use another wireless interface. A thin client on the system can package content in a packet with security settings and send the packet to the other device. Further, the thin client can accept packets from other devices. Based on one or more user settings and/or a level of trust, the thin client can determine if the packet should be accepted or rejected. If accepted, the thin client can store the content, located within the packet, for the user.

In embodiments, a combined NFC and Bluetooth interface communicates with an application and security wrapper to automatically distribute content, for example, business cards, presentation materials, (like documents, charts, spreadsheets and the like) and/or other materials. A centralized broker or server, which may be in spatial proximity to one or more devices, can act as a hub to distribute the content to other people. The information in the security wrapper or communication and other information or settings, e.g., the identity of the receiving party, the level of trust, the meeting topic (for closely spaced meeting rooms), etc., can be considered to determine if a device wants to accept the content.

In an alternative embodiment, the broker could be a conference server, and the materials could be combined with those at other locations and sequenced according to an agenda. Essentially authentication, sign-in, and supplying the materials could be done via NFC and/or Bluetooth upon arrival of each individual.

In still another embodiment, two devices with a combined NFC and Bluetooth interface, in communication with an application and security wrapper, can locate and interact directly rather than through a broker. Thus, devices that are within spatial proximity and are participating in the same conference or meeting can interact to exchange content. The application resident on the device can manage the identity, trust relationships, meeting topic, and other factors associated with exchanging content. The device receiving content can decide whether to accept, reject, or quarantine the content information.

Other embodiments include a polling mechanism, where a specific query is launched within a specified sub-group of the members present for a particular conference or meeting. This sub-group can be designated "a trust group" to facilitate sidebar communications, additional material sharing, and/or annotation of the additional materials being shared. Further, there may be an application that can locate one or more documents, vCards, charts, spreadsheets, project management graphs, etc. on a user's device that can be made available to one or more other devices. Yet another module of the application may layer a hierarchical structure that reveals information about the materials or content, based on the trust relationship between the parties. Thus, document versioning for different audience members can be managed for users. This hierarchical structure can pull information from directories, links, contextually linked materials, and other sources to provide new information about the content. These "contextual linkages" may be as described in Avaya patent publication Ser. No. 12/837,919, entitled "CONTEXTUAL CORRELATION ENGINE," filed on Jul. 16, 2010, which is incorporated herein by reference for all that it teaches and for all purposes. Still another module may control access to the device or to content. Different access modes may include, but are not limited to, Open (essentially open and willing to accept materials from anyone proximately located for the same conference or meeting), Invite/Response mode (essentially willing to see offers to share materials), Buffer mode (willing to accept but quarantine materials), Reject mode (where all materials are rejected), and other possible modes including "Defer", "Deflect", etc. The application can allow a degree of trust to be considered when people collaborate to determine how much of their device would be exposed to the other party.

It should be noted that the systems and component herein can function in different environments. While embodiments of the devices or the broker described herein may exchange content in a one-to-one transfer, the devices and the broker may also exchange content between a device and a broker or between a device or broker and two or more other devices. Thus, the systems and components can accomplish a device-to-device transfer, a device-to-broker transfer, a broker-to-device transfer, a device-to-many devices transfer, or a broker-to-many devices transfer. This flexibility provide advantages over previous wireless systems.

The term "near field communication (NFC)" as used herein can refer to any interface using NFC technology, such as, radio frequency identity (RFID) devices (whether passive or active RFID). NFC is a short-range high frequency wireless communication technology which enables the exchange of data between devices over a 10-20 centimeter (4 to 8 inch) distance. NFC is as described in ISO/IEC 14443 proximity-card standard (proximity cards, RFIDs or the like), which is incorporated herein by reference for all that it teaches and for all purposes. NFC communicates via magnetic field induction, where two loop antennas are located within each other's near field, effectively forming an air-core transformer. It operates within the globally available and unlicensed radio frequency ISM band of 13.56 MHz. Most of the RF energy is concentrated in the allowed 14 kHz bandwidth range, but the full spectral envelope may be as wide as 1.8 MHz when using ASK modulation. NFC supports data rates of: 106, 212, 424 or 848 kbit/s.

The term "Bluetooth" as used herein can refer to any of the proprietary open wireless technology for exchanging data over short distances (using short wavelength radio transmissions) from fixed and mobile devices or for creating personal area networks (PANs) with high levels of security. Bluetooth was created by Ericsson in 1994, and Bluetooth can connect several devices simultaneously without synchronization problems. Bluetooth is currently managed by the Bluetooth Special Interest Group.

Bluetooth provides a secure way to connect and exchange information between devices such as faxes, mobile phones, telephones, laptops, personal computers, printers, Global Positioning System (GPS) receivers, digital cameras, and video game consoles. Bluetooth is a standard wire-replacement communications protocol primarily designed for low power consumption, with a short range (power-class-dependent: 100 m, 10 m and 1 m, but ranges vary in practice; see table below) based on low-cost transceiver microchips in each device. Because the devices use a radio (broadcast) communications system, they do not have to be in line of sight of each other.

Bluetooth has been proposed as a means for extending the range of NFC capabilities. Recently proposals pair NFC technology with Bluetooth to extend the range of NFC transactions. Bluetooth 2.1 devices, with NFC support, can pair as NFC devices through the Bluetooth interface. The process of activating Bluetooth on both sides, searching, waiting, pairing and authorization will be replaced by a simply bringing the mobile phones close to each other. This pairing of technology is what is referred to herein as "combined NFC and Bluetooth."

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

The preceding is a simplified summary to provide an understanding of some aspects of the embodiments. This summary is neither an extensive nor exhaustive overview of the various embodiments. It is intended neither to identify key or critical elements nor to delineate the scope of the embodiments but to present selected concepts in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The present disclosure is described in conjunction with the appended Figs..

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. Various changes may be made in the function and arrangement of elements without departing from the spirit and scope of the invention as set forth in the appended claims.

Figure 1:
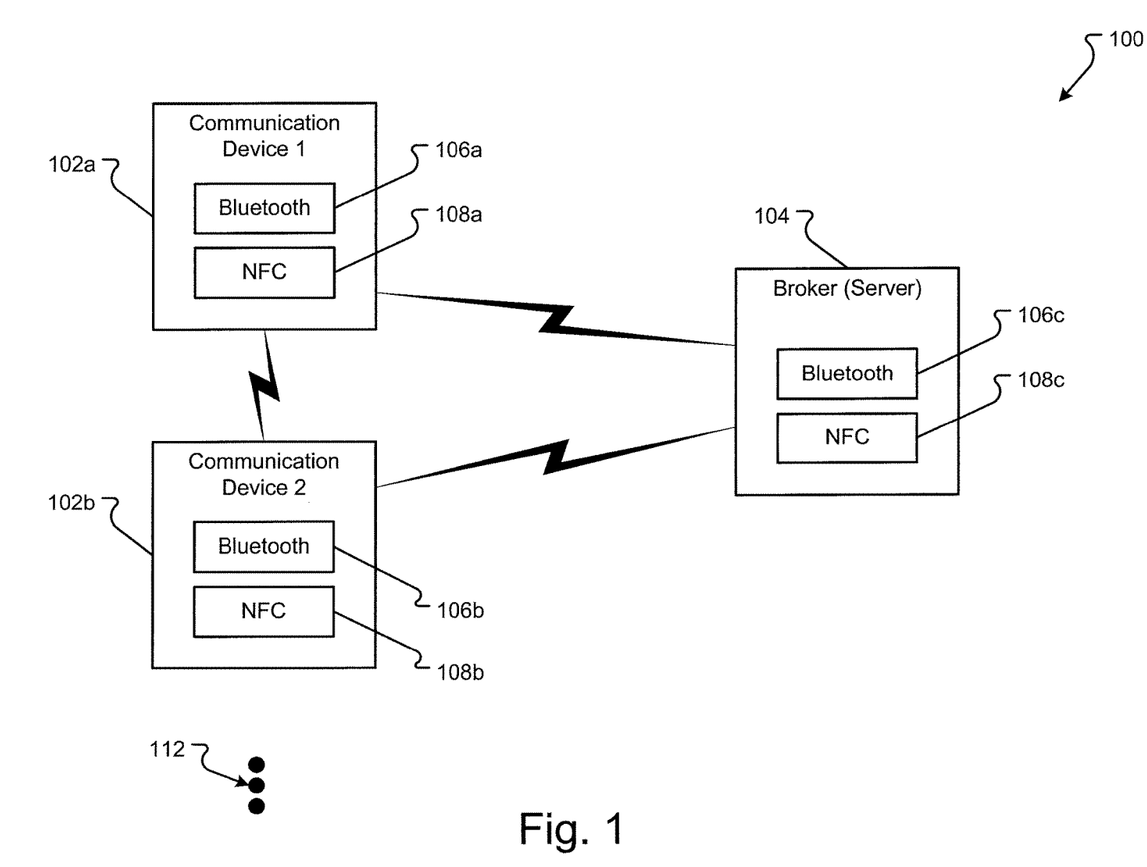
FIG. 1 is a block diagram of an embodiment of a system for sharing content between devices.

A system 100 for exchanging information over a combined NFC and Bluetooth wireless infrastructure is shown in FIG. 1. The devices in the system 100 may be hardware and/or software and may function as a computer system with components similar to those described in conjunction with FIGS. 7 and 8. In embodiments, the system 100 can include one or more communication devices 102a, 102b, a broker (server) 104, and/or one or more other components or communication devices.

A communication device 102 can be any mobile device, laptop, tablet computer, or other type of device that can communicate wirelessly. The communication device 102 can include hardware, such as, a processor and memory as described in conjunction with FIGS. 7 and 8. The communication device 102 can also be operable to execute a combined Bluetooth 106 and NFC 108 wireless interface. The NFC 108 and Bluetooth 106 interface is shown as separate modules but is embodied as a combined interface.

In embodiments, the combined Bluetooth 106 and NFC 108 wireless interface of the communication device 1 102*a* is operable to communicate with another communication device(s). For example, communication device 1 102*a* can communicate wirelessly with communication device 2 102*b*. Further, communication devices 102 can also be operable to communicate wirelessly with the broker 104 via the combined Bluetooth 106 and NFC 108 wireless interface.

Figure 7:
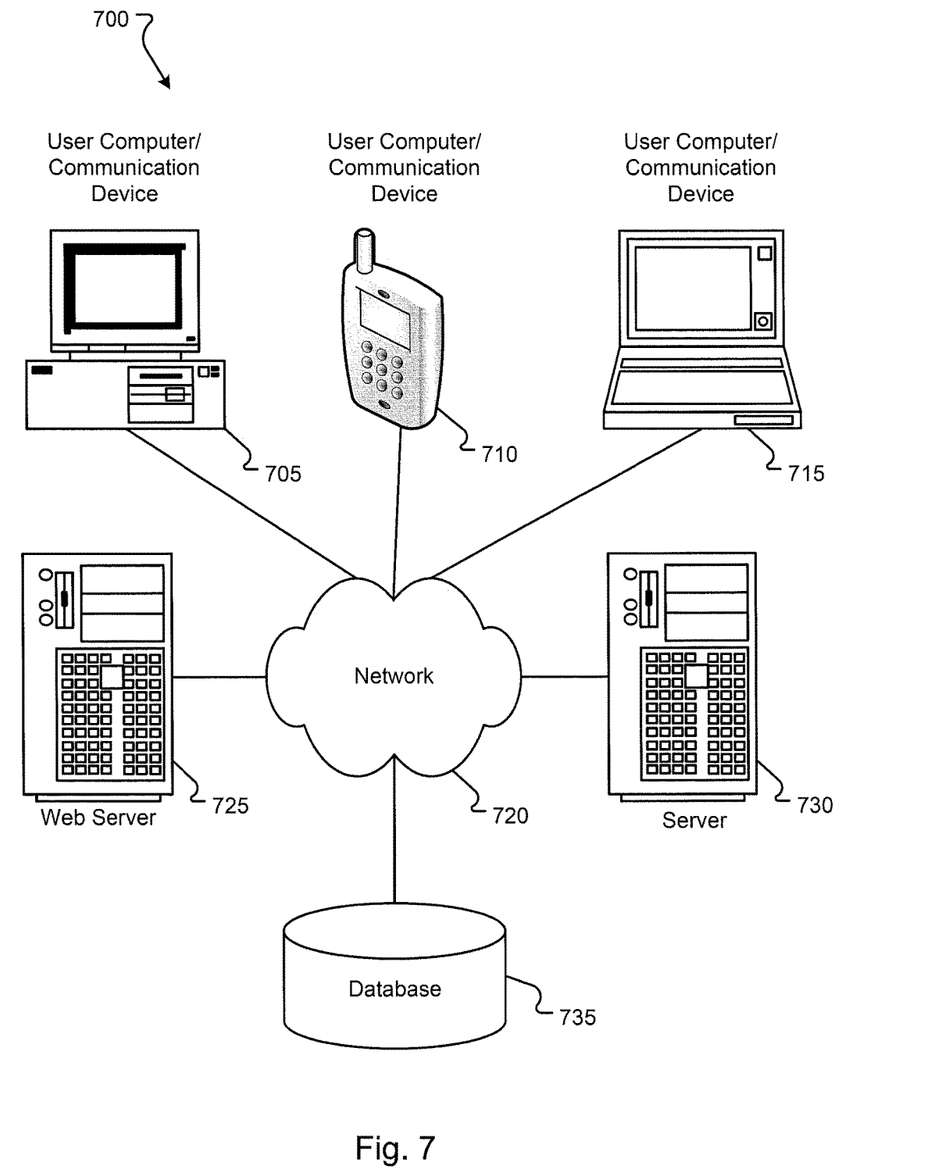
FIG. 7 is a block diagram of an embodiment of a computing environment operable to execute the HA protected VM.
Figure 8:
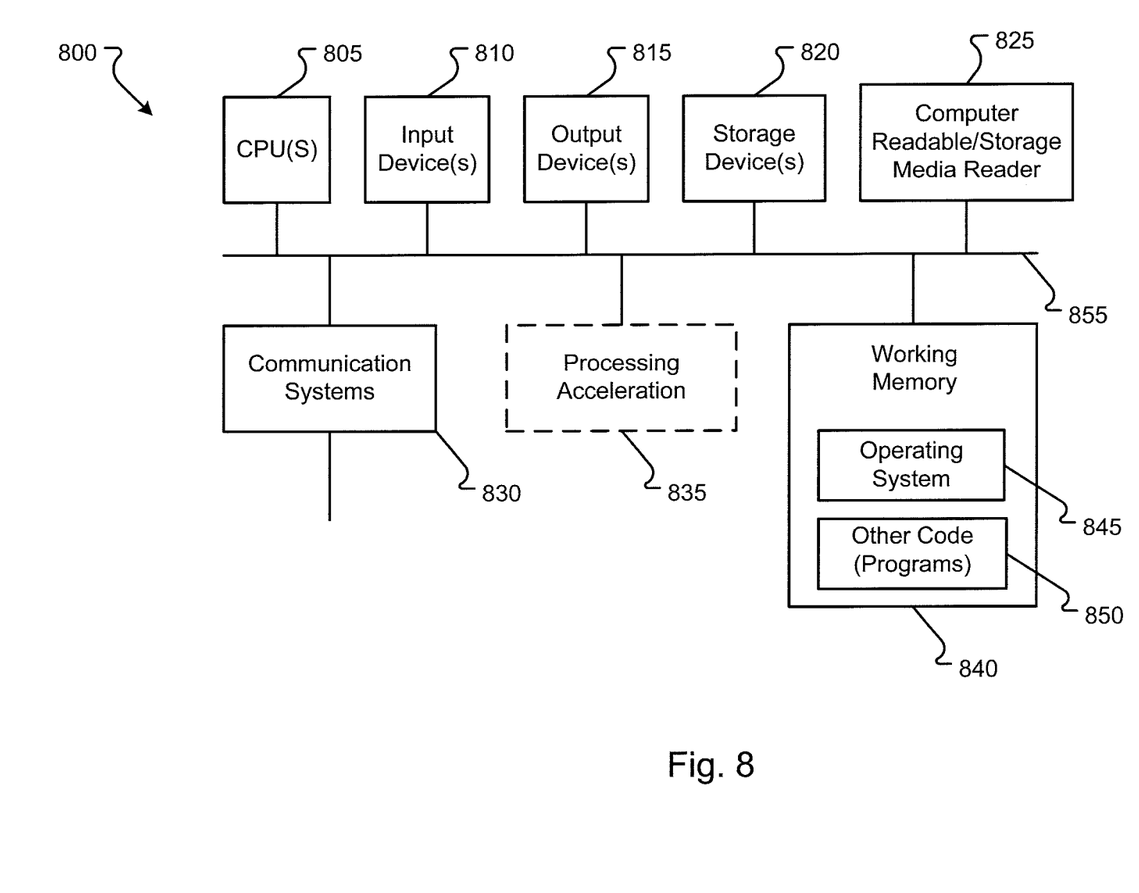
FIG. 8 is a block diagram of an embodiment of a computer operable to execute as a server that operates a VM.

The broker 104 may be hardware and/or software and may include a processor and memory, as described in conjunction with FIGS. 7 and 8. The broker 104 can be a server which functions as a computer system, as described in conjunction with FIGS. 7 and 8. The broker 104 may also operate a combined Bluetooth 106*c* and NFC 108*c* wireless interface similar to the communication device 102. Thus, the broker 104 is operable to communicate with one or more communication devices 102 through the combined Bluetooth 106*c* and NFC 108*c* wireless interface. In embodiments, the broker 104 is operable to broadcast or transmit materials to either of the communication devices 102*a* or 102*b*.

Figure 2A:
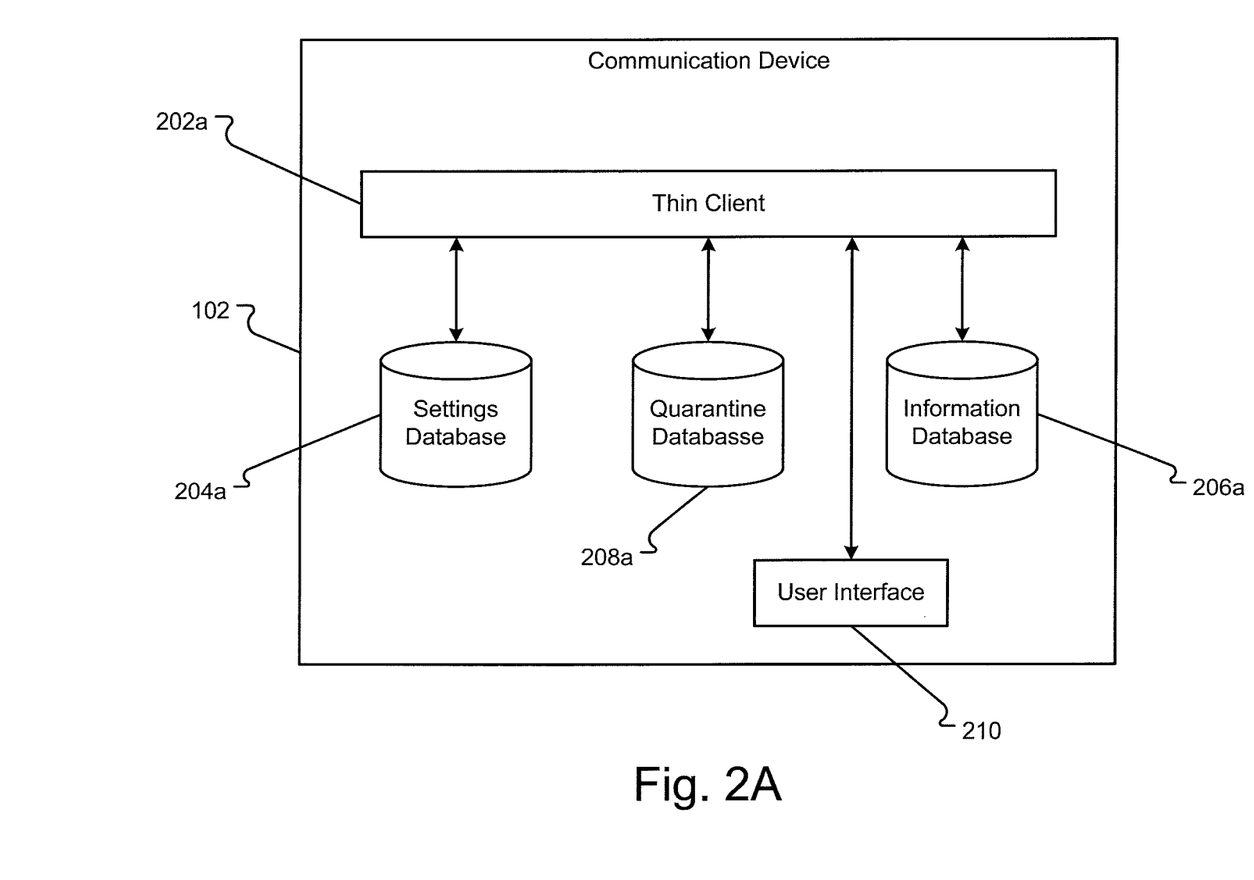
FIGS. 2A and 2B are a block diagrams of embodiments of a communications device and a broker (server), respectively, which can push or receive content.

An embodiment of a communication device 102 is shown in FIG. 2A. The communication device 102 may include one or more components which may include hardware and/or software. The components herein may be described as software modules but the communication device 102 is not so limited. The components within the communication device 102 can include one or more of, but are not limited to, a thin client 202, a settings database 204, an information database 206, a quarantine database 208, and a user interface 210. The user interface 210 is described in conjunction with FIG. 4.

A thin client software module 202 is operable to conduct communications through the combined Bluetooth 106 and NFC 108 wireless interface. The thin client 202 may be stored in memory and executed by a processor of the communication device 102. The thin client 202 can be downloaded from a source and installed in the communication device 102 for use with communicating information across a combined Bluetooth 106 and NFC 108 wireless interface. The thin client 202 may also be operable to receive and resend materials that may be stored in the information database 206. In embodiments, the thin client 202 may also be able to receive materials that may be quarantined in the quarantine database 208. The thin client 202 may also be able to access settings as stored in the settings database 204. Further, the thin client 202 can provide a simple user interface 210 that can interact with a user of the communication device 102.

The information database 206 can be any type of database or storage system as explained in conjunction with FIGS. 7 and 8. The information database 206 can include information or materials that the user of the communication device 102 wants to share with other communication devices. For example, if the user is doing a presentation to a group of people, the user may decide to store meeting materials in the information database 206. Thus, the information database 206 functions as a data store or memory operable to store materials and allow the thin client 202 to either retrieve those materials or store new materials, as directed by the user. The information database 206 can function to also receive or store materials which are provided to the communication device 102 through communications to the combined Bluetooth 106 and NFC 108 wireless interface, and sent to the information database 206 through the thin client 202.

The quarantine database 208 can be a secure storage area within memory or in other storage device, as described in conjunction with FIGS. 7 and 8. The quarantine database 208, in embodiments, is operable to store materials that have not been verified, approved, and/or authenticated by the user and may pose a security risk. These materials may be materials received by the communication device 102 but have yet to be accepted by the user. Thus, the quarantine database 208 provides a way of storing received materials, in a safe area, that does not expose those materials to other systems within the communication device 102. The quarantine database 208 receives materials and then provides information to the thin client 202 to be presented on the user interface 210 such that the user can accept or reject the materials in the quarantine database 208. If the materials are rejected, the thin client 202 may delete those materials from the quarantine database 208 before presenting those materials to the user of the communication device 102.

The settings database 204 can also be any type of memory or storage device, as described in conjunction with FIGS. 7 and 8. In embodiments, the settings database stores one or more settings that may be predetermined by the user or may be automatically set and that manage the operation of the thin client 202. For example, the settings database 204 can store trust relationships with other devices. Thus, if another device is known and approved by the user, the relationship can be trusted, and the thin client 202 will accept any information sent from the trusted source. In other embodiments, unknown devices may not be trusted, and materials from the unknown device(s) are either rejected or quarantined. These relationships, based on knowledge about the sender or the sent materials, govern how the thin client 202 processes received materials.

The thin client 202 may also have two or more states. The states can also govern the function of the thin client 202. Different access modes may include, but are not limited to, Open (essentially open and willing to accept materials from anyone proximately located), Invite/Response mode (willing to see offers to share materials), buffer mode (willing to accept but quarantine materials), Reject mode (where all materials are rejected), and other possible modes. The thin client 202 can also establish a degree of trust to be considered when people collaborate to determine how much of their device would be exposed to the other party. For example, the thin client 202 can operate in an open state, where the thin client 202 accepts any material sent to the communication device 102. Thus, the thin client allows materials to be stored through the thin client 202 directly to the information database 206. In a more secure state (e.g., a buffer mode), the thin client 202 can send any materials received by the communication device 102 to the quarantine database 208. The thin client 202 may then present items of information about the received materials in the quarantine database 208 to the user interface 210. The user may then accept those materials, by interacting with the user interface 210, and moving the materials from the quarantine database 208 to the information database 206. These different states are set by the user when the user interacts with a user interface 210 and sends a command to the thin client 202 to make a setting in the settings database 204. Other settings can also be set either by user interaction or automatically, for example, settings for how materials are shared from the information database 206 to other communication devices, the speed of interactions, the exchange of credentials, or other information needed for the thin client 202 to conduct interactions with other devices or brokers 104.

Figure 2B:
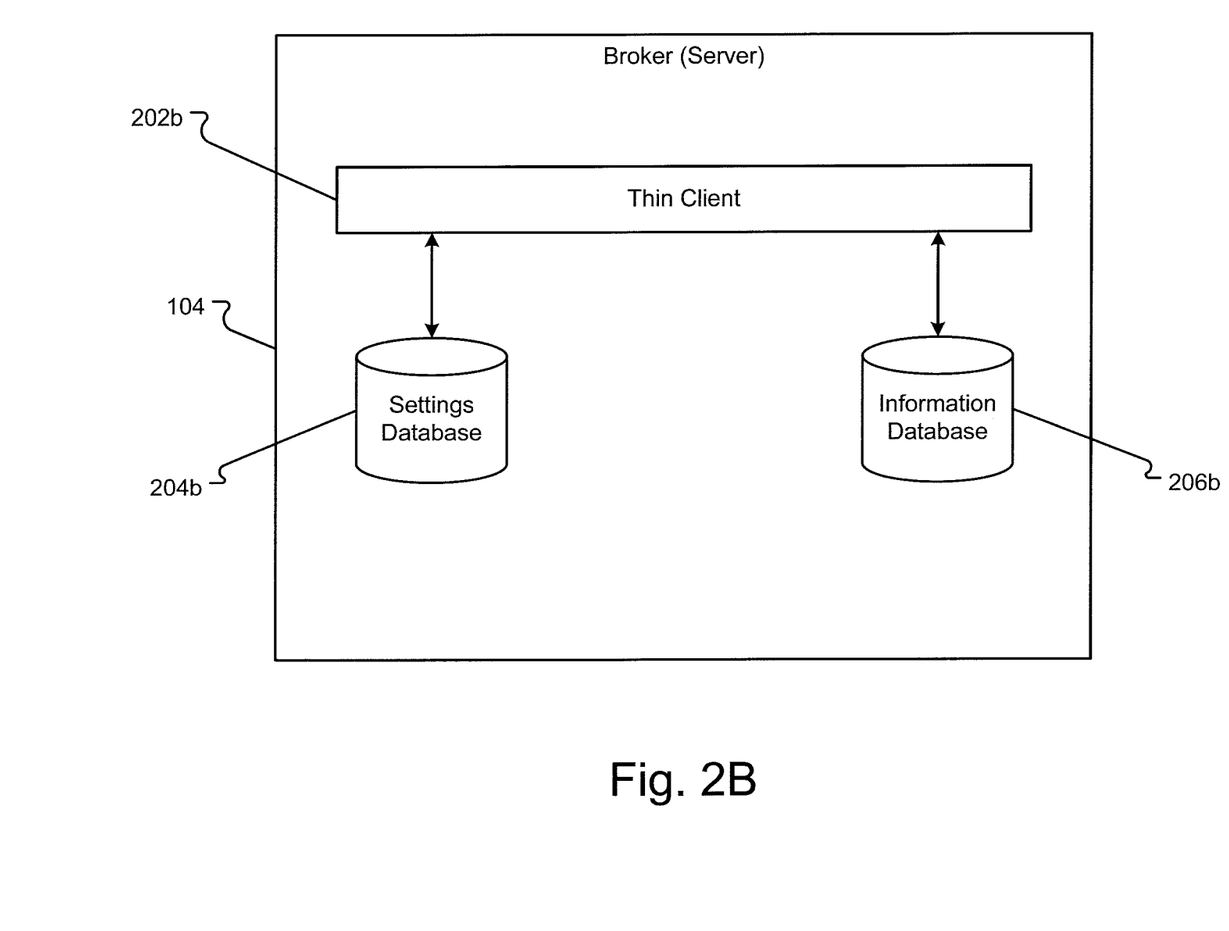

An embodiment of a broker 104 is shown in FIG. 2B. The broker 104 may operate as a server computer system, having a processor and memory, as described in conjunction with FIGS. 7 and 8. The broker 104 may include one or more components that will be described hereinafter as software modules, but the broker 104 is not so limited. In embodiments, the broker 104 can include a thin client 202*b*, an information database 206*b*, and a settings database 204*b*. The thin client 202*b*, the information database 206*b*, and the settings database 204*b* may function similarly or be the same as the components explained in conjunction with FIG. 2A. The thin client 202*b* is operable to receive and send information through the combined Bluetooth 106 and NFC 108 wireless interface. The thin client 202 interacts with the settings database 204*b* and the information database 206B. Materials may be stored or retrieved from the information database 206*b* in order to send to communication devices. The settings database 204*b* is operable to control the function of the thin client 202, as described in conjunction with FIG. 2A.

Figure 3:
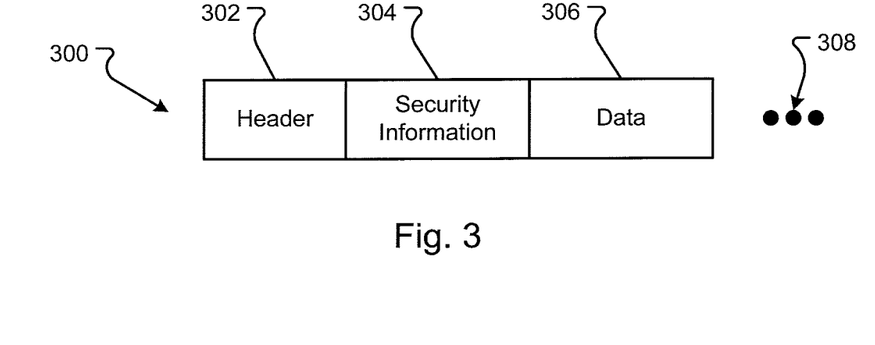
FIG. 3 is a logical block diagram of an embodiment of a data packet that can be exchanged to push or receive content.

An embodiment of a message 300 that may be sent over the combined Bluetooth 106 and NFC 108 wireless interface is shown in FIG. 3. The message packet 300 can include different portions or fields, which represent segments of the communication packet 300 where certain types of information are stored. These portions can include a header 302, security information 304, and data 306.

The header 302 can include information that facilitates the communication of information. Thus, the header 302 can include the destination and/or the origin of the communication packet 300. The header 302 may also include other information to synchronize the data, such as a data offset, a data length, or other information that allows a communication device 102 or a broker 104 to accept the data. In embodiments, the header 302 includes information about the data, such as a title, an author, the associated meeting to which the materials pertain, or other information that may be pertinent to the receiver. This header information can be used by the receiver to determine how to process the data.

Security information 304 can include one or more items of authentication or security information for the receiver. This security information 304 can include certificates or codes that allow the receiver to determine whether to accept the data. The security information 304 may be matched to other information used by the settings database 204 to determine how to process the data for the thin client 202. The security information 304 may also be presented to the user by the thin client 202 through the user interface 210.

The data field 306 can store the data or content that is being transferred between the different devices. The data can include presentation materials, documents, or other information that may be exchanged between two devices or between a device 102 and a broker 104. The data may be encapsulated in one or more protocols or forms that may be accepted by the communication device 102 or the broker 104.

Figure 4:
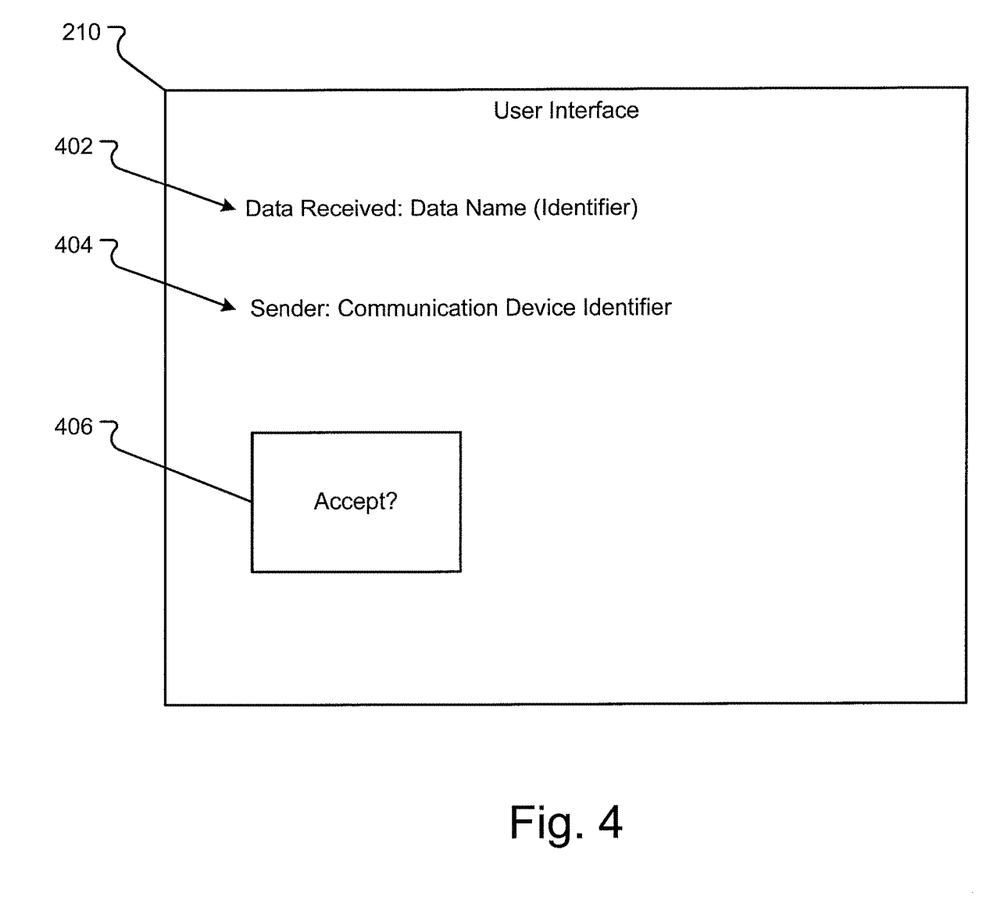
FIG. 4 is a visual representation of a user interface that allows for a user to make decisions regarding received content.

An embodiment of a user interface 210 presented to the user by the thin client 202 is shown in FIG. 4. The user interface 210 can be displayed on a user interface device, as explained in conjunction with FIGS. 7 and 8. The user interface 210 can present information to a user in the user interface 210 and allow for the user to provide inputs through one or more selectable interface devices on the user interface 210.

In embodiments, the user interface 210 includes a "Data Received" area 402, a "Sender" area 404, and an accept button 406. The Data Received area 402 presents information about the data that may be included in the header 302 or the security information 304. This information can present to the user an idea of what data is in data field 306. Thus, the user interface 210 provides the user with the ability to research the data that may be in the quarantine database 208 or the information database 206 and determine if that data should be kept.

The Sender area 404 provides information about the person or system that sent the information. Thus, the Sender area 404 can provide a display of information from either the header field 302 or the security information field 304. The Sender area 404 may display a person's name, a system name or identifier, which identifies the user of another communication device 102 or the broker 104, or other information. This sender information may be pertinent to the communication device 102 to recognize whether the communication of information is associated with some event or has other meaning to the user of the communication device 102.

The user is able to interact with the communication device 102 through one or more user interface devices, such as, the accept button 406. Thus, the accept button 406 is selectable by the user using a user interface selection tool, such as a mouse, a touch pad screen, voice command, a menu system, or some other way of interacting with communication device 102. The user can select the accept button 406 if the user desires to accept the information received by the communication device 102 and described in the Data Received area 402 and the Sender area 404. In embodiments, if the user does not select the accept button 406 within a predetermined amount of time, the information is deleted. In other embodiments one or more other user interface selectable devices may be presented to the user. As such, the user may also be able to select the user interface device to reject the materials.

Figure 5:
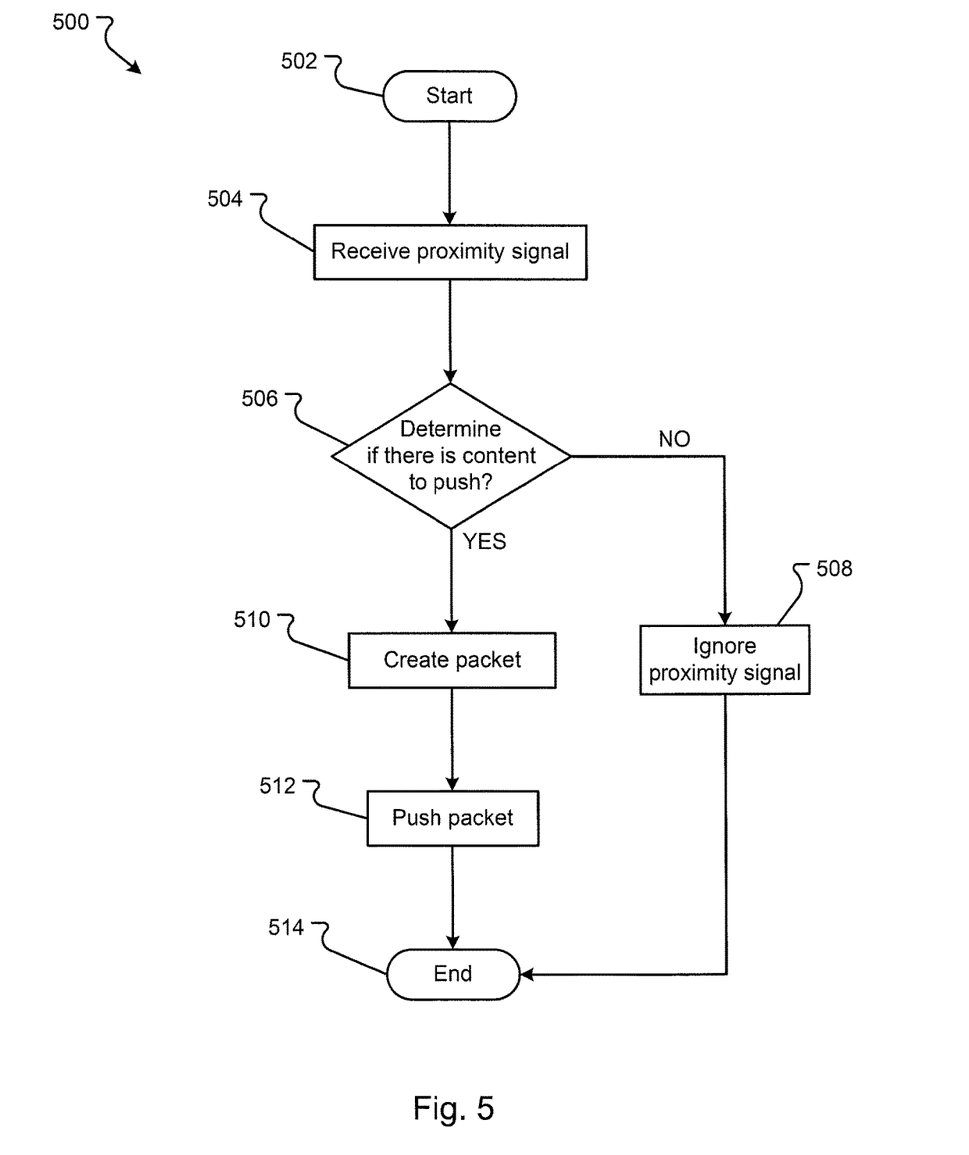
FIG. 5 is a flow diagram of an embodiment of a process for pushing content.

An embodiment of a method 500 for pushing content is shown in FIG. 5. While a general order for the steps of the method 500 is shown in FIG. 5. Generally, the method 500 starts with a start operation 502 and ends with an end operation 514. The method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, user interfaces, etc. described in conjunction with FIGS. 1-4.

A communication device 102 or a broker 104 can receive a proximity signal, in step 504. A proximity signal may be any type of signal received by the combined Bluetooth 106 and NFC 108 wireless interface, or other wireless interface, that indicates another device is within spatial proximity. Spatial proximity is a function of the receive and/or transmit ranges of the combined Bluetooth 106 and NFC 108 wireless interface or other wireless interface. Thus, the proximity signal can be an initial signal to the Bluetooth devices, an excitation of a receiver in the NFC system 108, or some other exchange of signals between proximally-located devices. The signal indicates that there is another device near enough to the communication device 102 or the broker 104 to send or receive content.

Upon receiving the proximity signal, the communication device 102 or broker 104 can determine if there is content to push to the other device, in step 506. In determining whether there is content to push, the processor sends the proximity signal to the thin client 202. The thin client 202 may then check the settings database 204 to determine if the user has set an indicator for content to be pushed and which content is to be pushed. If there is no content to push, the thin client 202 can ignore the proximity signal, in step 508.

If content is to be pushed according to the settings database 204, the thin client 202 may then access the content from the information database 206. The information may be collected and then placed in the data section 306 of a communication packet 300. Thus, the thin client 202 creates the communication packet 300, in step 510. In creating the communication packet 300, the thin client 202 can generate the header 302 and the security information 304 that is to accompany the data 306. The header 302 may include the identity of the communication device 202 or broker 104 that is sending the information. Further, the security information 304 can include an identity or trust information for the communication device 102 or the broker 104. The security information 304 may also include information that allows for authentication of the broker 104 or communication device 102.

After creating the packet, the thin client 202 sends the packet to the combined Bluetooth 106 and NFC 108 wireless interface to push the communication packet 300 to at least one other device, in step 512. The communication packet 300 is pushed by broadcasting the packet from the combined Bluetooth 106 and NFC 108 wireless interface in the communication device 102 or broker 104 to another device(s). The communication packet 300 may be pushed to the other device without creating a pairing between devices, as is customary with NFC and is new to Bluetooth, or may be pushed after the devices are paired.

Figure 6:
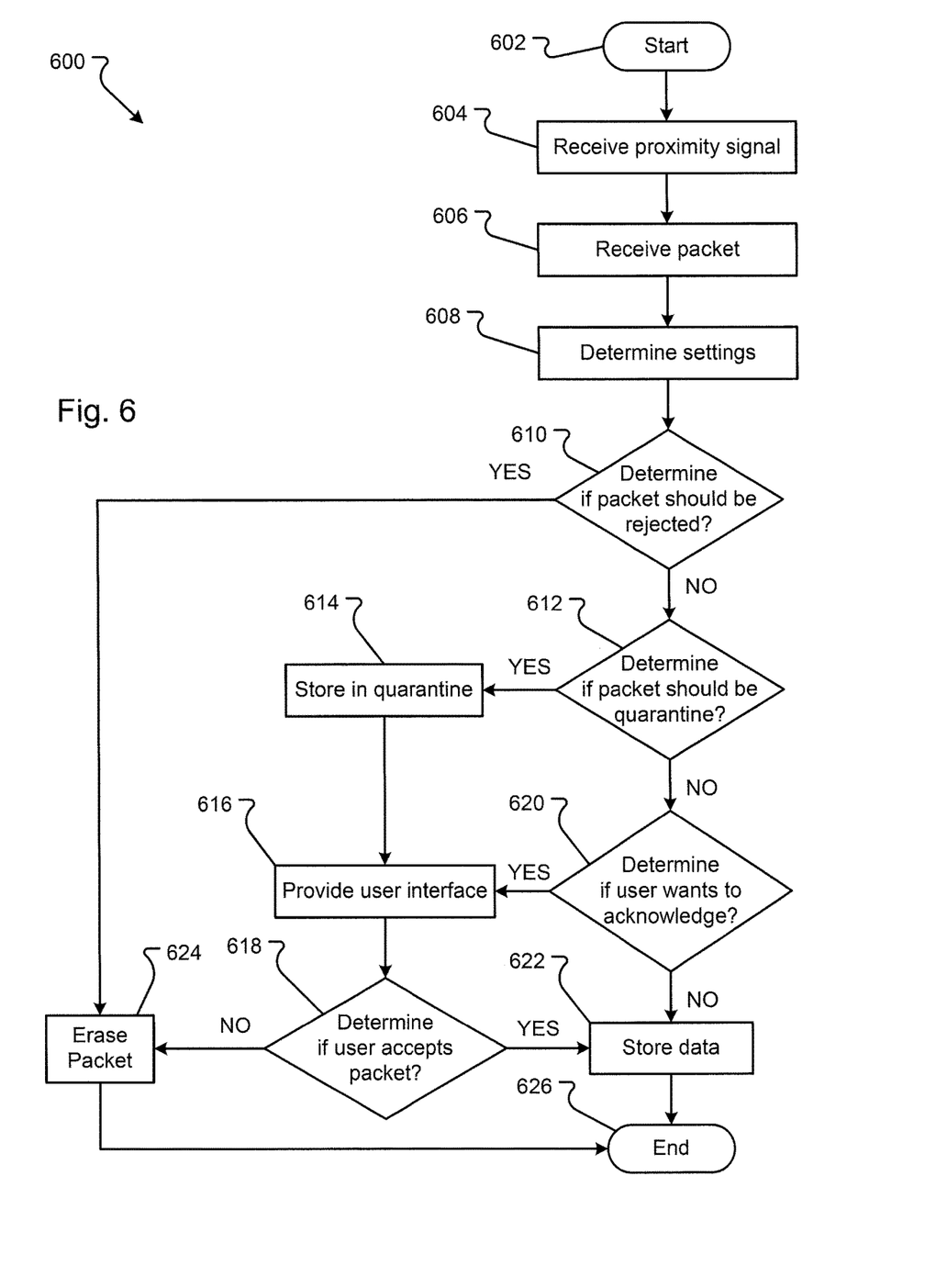
FIG. 6 is a flow diagram of an embodiment of a process for receiving content.

An embodiment of a method 600 for receiving content is shown in FIG. 6. While a general order for the steps of the method 600 is shown in FIG. 6. Generally, the method 600 starts with a start operation 602 and ends with an end operation 626. The method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, user interface, etc. described in conjunction with FIGS. 1-4.

The combined Bluetooth 106 and NFC 108 wireless interface receives a proximity signal, in step 604. The proximity signal can be any type of pairing or other signal received by a Bluetooth interface 106 or an excitation of an antenna associated with the NFC interface 108. This proximity signal indicates that there is at least one device within spatial proximity of the communications device 102. After receiving the proximity signal, other signals or packets may be received by the communications device 102.

Communications device 102 may then receive a communications packet 300, through the combined Bluetooth 106 and NFC 108 wireless interface, in step 606. The communications packet 300 can be a communication of materials from another communication device 102b or a broker 104 for the user of the communication device 102a. The communications packet 300 can include materials associated with a meeting the user is attending or a group to which the user belongs. This communications packet 300 can include data for materials, presentations, documents, spreadsheets, or other types of content that may be pertinent to an event or action conducted by the user of the communications device 102a.

Upon receiving the communications packet 300, the combined Bluetooth 106 and NFC 108 wireless interface sends the communications packet 300 to the thin client 202. The thin client 202 receives the communications packet 300 and may read information, from the header 302 and the securities information 304, to determine how to handle the received communications packet 300.

The thin client 202 can access the settings database 204 to determine user settings, in step 608. The user settings may include a trust relationship and/or an access mode, or one or more other settings that control the function of the thin client 202. The settings may be used to research and evaluate data within the communications packet 300. For example, the header 302 can include the name of the device or user that sent the communications packet 300 to the communications device 102a. The identifier for the user of communications device 102b may be compared to a trust relationship listing to see if the user is trusted. If the user is trusted, the data within the data field 306 may be stored automatically within the information database 206. However, if the user or communications device 102b is not known, the data may be stored in the quarantine database 208. Other settings may also be checked. Upon receiving the settings and the information in the communications packet 300, the method 600 proceeds to step 610.

In step 610, the thin client 202 determines if the communications packet 300 should be rejected. Thus, the thin client 202 can apply one or more user setting rules to the communications packet 300. For example, if the sender is an un-trusted source, the thin client 202 may reject the communications packet 300. If the user settings indicate that the communications device 102a is in a reject state, the thin client 202 may reject any communications packet 300 received by the combined Bluetooth 106 and NFC 108 wireless interface. One or more other user settings may be applied which instruct the thin client 202 to reject the communications packet 300. If the communications packet is rejected, step 610 proceeds YES to step 624, where the thin client 202 erases or discards the communications packet 300. If the communications packet 300 is not rejected, step 610 proceeds NO to step 612.

In step 612, the thin client 202 determines if the communications packet 300 should be quarantined. Thus, if the user settings indicate that all packets, or at least some packets, should be quarantined, the thin client 202 can determine which packets are to be sent to the quarantine database 208. For example, if the source is partially trusted or if the communications device 102a is in a user verify mode, any data received by the combined Bluetooth 106 and NFC 108 wireless interface may be stored in the quarantine database 208. If the material is to be quarantined, step 612 proceeds YES to step 614. If the material is not to be quarantined, step 612 proceeds NO to step 620.

In step 614, the thin client 202 stores the material in the quarantine database 208. As such, the material is not accessed, but the whole communications packet 300 may be stored in a secure storage area of the quarantine database 208. This secure storage prevents any material within the packet 300 from corrupting or having access to other functions of the communications device 102a. This quarantine prevents viruses or other malicious content from being released into the communications device 102a.

In step 620, the thin client 202 determines if the user wants to acknowledge or accept the content. As such, the thin client 202 can access the user settings in the user settings database 204 to determine if material is supposed to be presented to the user for user approval. If the material is to be presented to the user, step 620 flows YES to step 616. If the material is not to be presented to the user, step 620 proceeds NO to step 622, where the thin client 202 stores the received content, from the data field 306, into the information database 206. Upon storing the materials, the thin client 202 can present the user with the indication that new material has been received and stored in the information database 206.

In step 616, the thin client 202 extracts information from header 302 or the security settings 304 to provide information about the content. That information about the content is inserted into a user interface 210, as presented to the user, in step 616. This information may include an identifier of the data, an identifier of the sender data, or other information, for example, the meeting that the material is associated with, a group that the material is associated with, or other information. This information may be provided in the user interface 210 to give the user an indication of where the content is from and what the content is. Further, the user interface 210 may provide one or more selectable user interface devices, such as, the accept button 406. The button allows the user to determine if the user wants to accept the material stored in the quarantine database 208 and transfer the material to the information database 206.

In step 618, the thin client 202 determines if the user has accepted the package. If the user selects one of the user selectable devices, such as, the accept button 406, the thin client 202 can determine that the user wishes to accept the content. If the user accepts the content, step 618 proceeds YES to step 622, where the content is stored in the information database 206. If the user does not accept the content, step 618 proceeds NO to step 624, where the thin client 202 erases the communications packet 300 from the quarantine database 208.

FIG. 7 illustrates a block diagram of a computing environment 700 wherein the systems, devices, servers, software modules, etc. may execute. As such, the system or components described in conjunction with FIG. 7 may be commodity hardware. The computing environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary computing environment 700 is shown with three user computers, any number of user computers may be supported.

Computing environment 700 further includes a network 720. The network 720 can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks. The network 720 may be the same or similar to network 107.

The system may also include one or more server computers 725, 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The computing environment 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as the active host 102 and/or the standby host 107.

The computing environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands.

FIG. 8 illustrates one embodiment of a computer system 800 upon which the systems, devices, servers, software modules, etc. described herein may be deployed or executed. The computer system 800 is shown comprising hardware elements that may be electrically coupled via a bus 888. The hardware elements may include one or more central processing units (CPUs) 808; one or more input devices 810 (e.g., a mouse, a keyboard, etc.); and one or more output devices 818 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 828; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 838, which can include a DSP, a special-purpose processor, and/or the like.

The computer-readable storage media reader 828 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 420 and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 848 and/or other code 880. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments n have been described in detail herein, it is to be understood that the concepts may be otherwise variously embodied and employed, and that the appended claims are intended to be construed to include such variations, except as limited by the prior art.

What is claimed is:

1. A method for managing packets in a device, comprising:
   a processor executing a thin client receiving a packet from either a near field communication (NFC) or a Bluetooth interface, wherein the packet is received from another device in spatial proximity, wherein the packet comprises an identifier that identifies at least one of a conference or meeting of a group of people, wherein the identifier that identifies the at least one of the conference or meeting of the group of people is used by the thin client to determine if the packet should be rejected, storing one or more user settings in a setting database;

storing secure content received over either the NFC interface or the Bluetooth interface in a quarantine database;

storing content received over either the NFC interface or the Bluetooth interface in an information database;

determining if the packet should be rejected based on the device and the other device being in spatial proximity and based on the identifier; and applying the following rules:
if the packet should be rejected, the thin client erases the packet; and
if the packet should not be rejected, the thin client stores content in the packet into the information database.

2. The method as defined in claim 1, wherein the device is one of a communication device or a broker.

3. The method as defined in claim 2, wherein the processor executing the thin client further:
receiving a proximity signal from the other device;
determining if there is content in an information database to push to the other device in response to receiving the proximity signal;
if there is no content to push, ignoring the proximity signal; and
if there is content to push, the processor executing the thin client creating a packet to be sent over either the NFC interface or the Bluetooth interface, sending the packet to either the NFC interface or the Bluetooth interface, and either the NFC interface or the Bluetooth interface pushing the packet to the other device.

4. The method as defined in claim 1, wherein the device is a separate device that brokers messages between a plurality of separate communication devices.

5. The method as defined in claim 1, wherein the identifier that identifies the at least one of the conference or meeting of the group of people is an in-person meeting of the group of people.

6. The method as defined in claim 5, wherein the identifier for the in-person meeting of the group of people is a meeting topic that identifies an individual meeting topic for closely spaced meeting rooms.

7. The method as defined in claim 6, wherein the meeting topic further identifies materials pertaining to the in-person meeting of the group of people.

8. A content sharing device, comprising:
a near field communication (NFC) interface and/or a Bluetooth interface;
a memory;
a processor in communication with the memory, and the NFC interface or the Bluetooth interface, the processor (a) receives a packet from either the NFC interface or the Bluetooth interface, wherein the packet is received from another device in spatial proximity, wherein the packet comprises an identifier that identifies at least one of a conference or meeting of a group of people, and wherein the identifier that identifies the at least one of the conference or meeting of the group of people is used by the processor to determine if the packet should be rejected, and (b) executes one or more modules, the modules comprising:
a settings database that stores one or more user settings;
a quarantine database that stores secure content received over either the NFC interface or the Bluetooth interface;
an information database that stores content received over either the NFC interface or the Bluetooth interface; and
a thin client in communication with the settings database, the quarantine database, and the information database, wherein the thin client:
determines if the packet should be rejected based on the content sharing device and the other device being in spatial proximity and based on the identifier; and
applies the rules:
if the packet should be rejected, the thin client erases the packet; and
if the packet should not be rejected, the thin client stores content in the packet into the information database.

9. The content sharing device as defined in claim 8, wherein the content sharing device is a communication device or a broker.

10. The content sharing device as defined in claim 9, wherein the thin client further:
receives a proximity signal from the other device;
in response to receiving the proximity signal, determines if there is content in the information database to push to the other device;
if there is no content to push, ignores the proximity signal;
if there is content to push, creates a packet to be sent over either the NFC or Bluetooth interface to the other device; and
sends the packet to either the NFC or Bluetooth interface.

11. The content sharing device as defined in claim 10, wherein the thin client further:
determines if the packet should be quarantined; and
stores the packet in the quarantine database.

12. The content sharing device as defined in claim 8, further comprising a user interface in communication with the processor, wherein the user interface:
provides information about the packet to a user; and
receives a signal from the user indicating the user wants to store the content in the packet.

13. The content sharing device of claim 8, wherein the content sharing device layers, in a hierarchical structure, information about materials or content, based on a trust relationship between parties in the conference or meeting, of the group of people in order to manage document versioning between the parties in the conference or meeting, of the group of people.

14. A content sharing device, comprising:
a wireless interface;
a memory;
a processor in communication with the memory, and the wireless interface, the processor (a) receives a packet from wireless interface, wherein the packet is received from another device in spatial proximity, wherein the packet comprises an identifier that identifies at least one of a conference or meeting of a group of people, wherein the identifier that identifies the at least one of the conference or meeting of the group of people is used by the processor to determine if the packet should be rejected, and (b) executes one or more modules, the modules comprising:
a settings database that stores one or more user settings;
a quarantine database that stores secure content received over the wireless interface;

an information database that stores content received over the wireless interface; and a thin client in communication with the settings database, the quarantine database, and the information database, wherein the thin client:

determines if the packet should be rejected based on the content sharing device and the other device being in spatial proximity and based on the identifier; and applies the rules:

if the packet should be rejected, the thin client erases the packet; and if the packet should not be rejected, the thin client stores content in the packet into the information database.

15. The content sharing device as defined in claim 14, wherein the identifier for the conference or meeting of a group of people is an in-person meeting of a group of people.

16. The content sharing device as defined in claim 15, wherein the identifier for the in-person meeting of the group of people is for a meeting topic that identifies different meeting topics in differently closely spaced meeting rooms.

17. The content sharing device as defined in claim 16, wherein the meeting topic further identifies materials pertaining to the in-person meeting of the group of people.

18. The content sharing device as defined in claim 14, wherein the thin client further:

receives a proximity signal from the other device;

in response to receiving the proximity signal, determines if there is content in the information database to push to the other device;

if there is no content to push, ignores the proximity signal;

if there is content to push, creates a packet to be sent over either the wireless interface to the other device; and sends the packet to the wireless interface.

19. The content sharing device as defined in claim 18, wherein the thin client further:

determines if the packet should be quarantined; and stores the packet in the quarantine database.

20. The content sharing device as defined in claim 14, further comprising a user interface in communication with the processor, wherein the user interface:

provides information about the packet to a user; and receives a signal from the user indicating the user wants to store the content in the packet.

* * * * *